April 25, 1950 B. M. KIMBALL 2,505,050
APPARATUS FOR MAKING PAPER CORD
Filed Sept. 7, 1948 3 Sheets-Sheet 1

INVENTOR.
BENJAMIN MILTON KIMBALL.
BY
Percy Freeman
ATTORNEY.

April 25, 1950  B. M. KIMBALL  2,505,050
APPARATUS FOR MAKING PAPER CORD
Filed Sept. 7, 1948  3 Sheets-Sheet 2
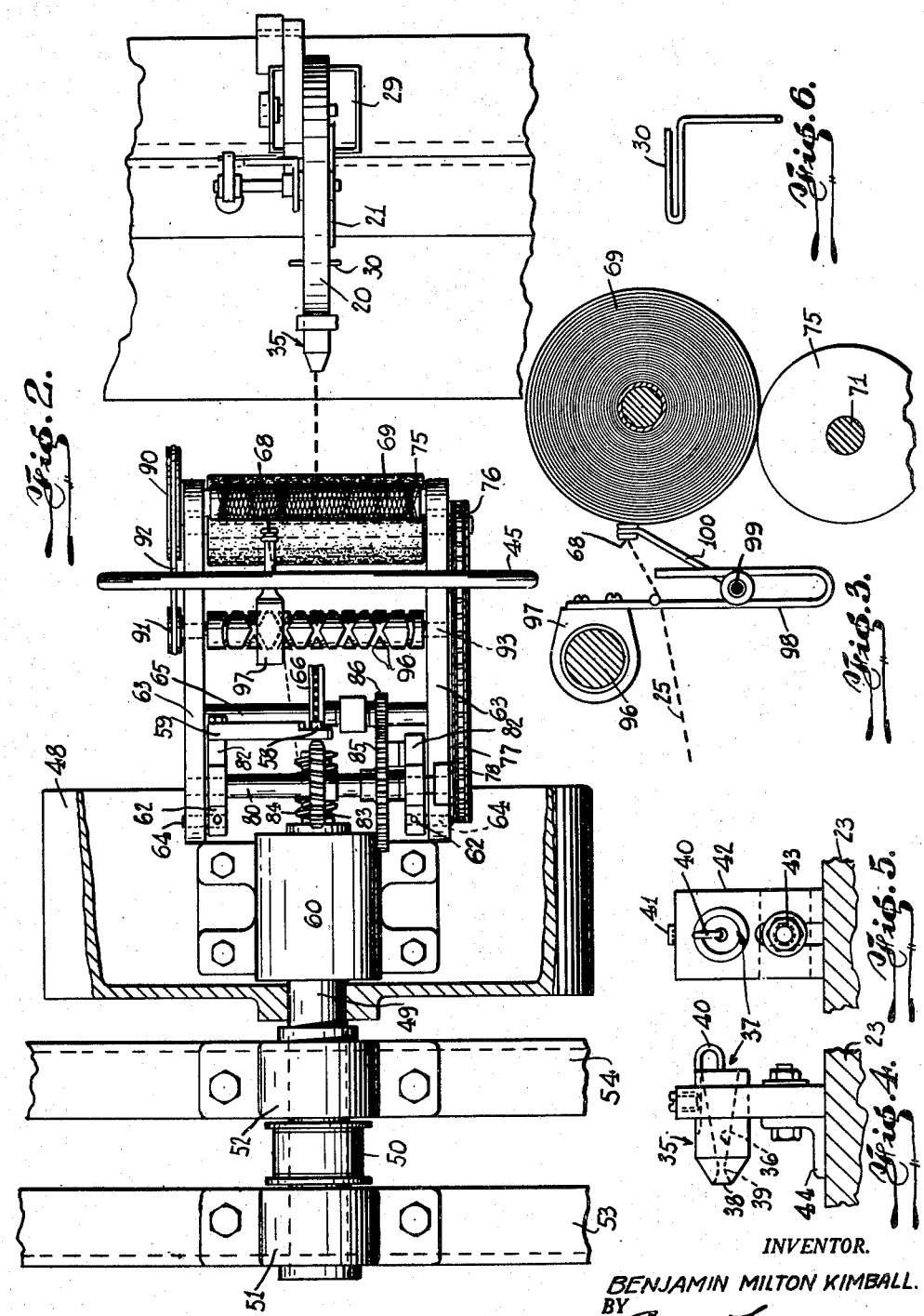
INVENTOR.
BENJAMIN MILTON KIMBALL.
BY
*Arew Freeman*
ATTORNEY.

April 25, 1950  B. M. KIMBALL  2,505,050
APPARATUS FOR MAKING PAPER CORD
Filed Sept. 7, 1948  3 Sheets-Sheet 3
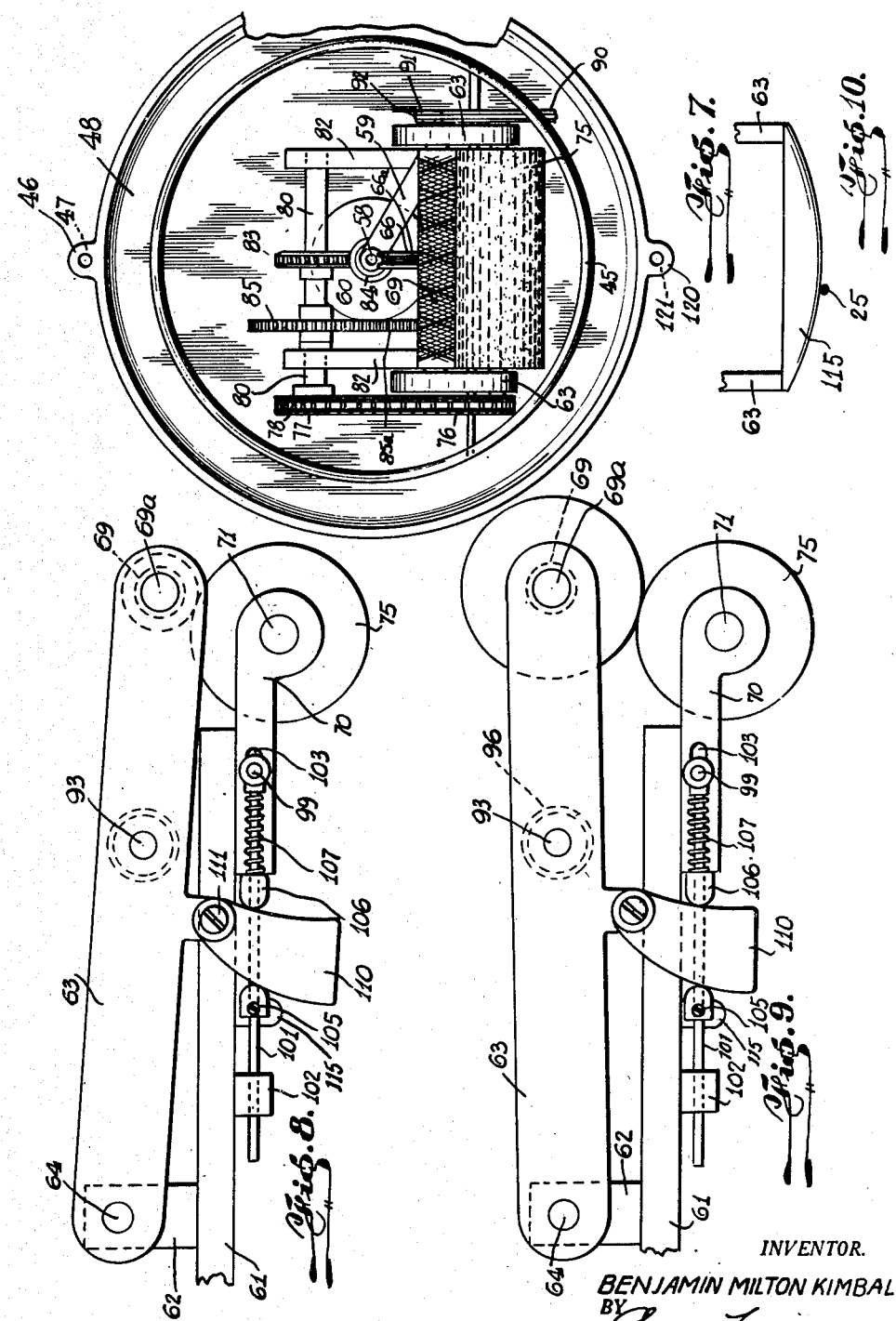
INVENTOR.
BENJAMIN MILTON KIMBALL
BY
ATTORNEY Patented Apr. 25, 1950

2,505,050

UNITED STATES PATENT OFFICE 2,505,050

APPARATUS FOR MAKING PAPER CORD

Benjamin Milton Kimball, Gilman, Vt., assignor to The Cellucord Corporation, a corporation of New York Application September 7, 1948, Serial No. 48,137

6 Claims. (Cl. 57—35)

This invention relates to improved apparatus for making improved paper cord.

The apparatus herein claimed constitutes an improvement over the apparatus shown in Patent No. 2,284,321, issued on May 26, 1942, on an application filed by me on June 4, 1940, Serial No. 338,688. The paper cord which is made by means of the apparatus herein claimed is an improved cord which is from 10% to 20% stronger than the cord which the patented apparatus produced. The apparatus herein claimed is operable at a faster rate of speed than the patented apparatus and it is able to produce twice as much cord in a given period of time as the patented apparatus was able to produce in the same period of time. Furthermore, the apparatus herein claimed renders it possible to twist and wind the cord in a single continuous operation, thereby rendering it feasible to produce extremely long lengths of wound cord which are free from knots.

The advantages of the present device over the patented device above mentioned correspond to the advantages of the present device over other paper cord making apparatus known to the art. It is accordingly a principal object of this invention to provide a paper cord making machine which produces a stronger cord, at a faster rate of speed, and in longer knotless lengths, than can be produced on other machines of the same general character known to the art.

Another principal object of this invention is the provision of a machine as claimed, in which the twisting and winding operations constitute but two phases of a single continuous operation, the machine being capable of producing the cord and winding it upon a spool at the same time.

Other objects of the invention include the provision of a machine of the character described, in which positive safeguards are provided to prevent entanglement of the cord either in its unfinished or finished conditions, with the operative parts of the machine. Also included in the additional objects of this invention is the provision of an improved type of cord winding apparatus, useful especially in connection with the present cord winding machine.

I attained these objects by mechanisms illustrated in the accompanying drawing, in which:

Fig. 2 is a top view thereof.

Fig. 3 is a side view of the cord winding mechanism of the machine partly in vertical section.

Fig. 4 is a side view of the first feeding and forming die of the machine.

Fig. 5 is a back view thereof.

Fig. 6 is a back view of the moisture scraper of the machine.

Fig. 7 is a front view of the cord forming and winding apparatus on the line 7—7 of Fig. 1.

Fig. 8 is a side view of the spool support and of the spool follower, the spool being shown empty or virtually empty of cord.

Fig. 9 is a view similar to that of Fig. 8 showing the respective positions of the spool support and the spool follower after the spool has been wound completely or substantially with cord.

Fig. 10 is a view of the compensating plate which compensates for variations in the distance between the cord feeding wheel of the winding mechanism and the several parts of the spool being wound.

Figure 1:
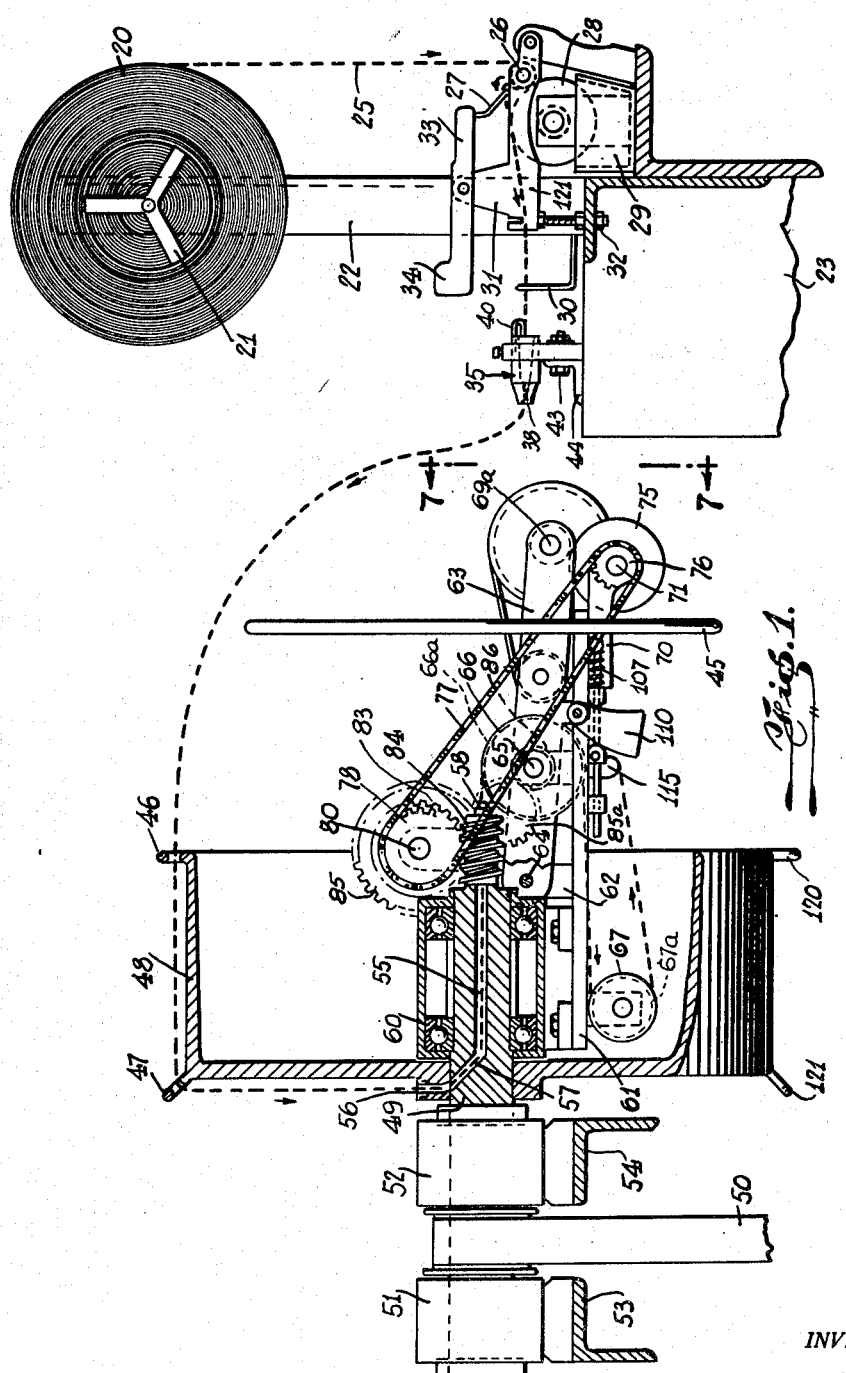
Fig. 1 is a side view of the entire machine, partly broken away and in vertical section to expose some of the operative parts of the machine which would otherwise be hidden from view.

The cord which the present machine produces is made of paper drawn from a roll 20 of paper tape or strip. This roll is shown mounted on a freely rotatable reel 21 which is supported on stand 22, fixed on frame 23. The dotted line 25 represents the paper as it is drawn from the roll and through the machine, the form of the paper changing with each machine operation performed thereon from a flat strip to a twisted cord or twine. The paper issues from the roll in the form of a flat strip which passes around a roller 26 to a lifter 27. It then engages a rotatable roller 28 which extends in part into a pan or tray 29 containing a wetting or sizing agent. Roller 28 is power-driven and so arranged that the R. P. M. may be changed. If more wetting or sizing agent is required, the roller speed is increased. If less wetting or sizing agent is required, the roller speed is decreased. To insure against an excessive application of the wetting or sizing agent to the paper, a scraper 30 is provided.

Roller 26 is mounted on a pivotally mounted arm 31 which is adjustably positionable relative to frame 23 and hence to roller 28 and pan 29 mounted on said frame, by means of adjusting screw 32. Pivotally supported by said pivotally mounted arm 31 is another arm 33 which is shown to support the paper lifter 27 at one end and to be provided with a counterweight 34 at its opposite end. Since arm 33 is supported by arm 31, adjusting screw 32 will, to a certain extent, also be instrumental in adjusting the position of arm 33 and more especially of the paper lifter which it supports, relative to roller 28.

It will be seen from the foregoing that as the paper strip passes from the lifter 27 to the wetting roller 28, the extent of its contact with said roller will be determined by the influence upon it of the paper lifter. By this means the extent to which the wetting agent is applied to the paper is controlled. Should excessive quantities of the wetting agent be applied to the paper, they will be removed by scraper 30 as the paper passes through it. The paper is now prepared for the forming and twisting operations.

In the next stage of its progress through the machine, the paper passes through a forming die 35. Detailed views of this die are presented in Figs. 4 and 5 of the drawing. It will there be seen that the die has a hole 36 formed therein, said hole being larger at its inlet end 37 than at its outlet end 38. Intermediate the two ends is a constriction 39. A U-shaped wire 40 is held in place by means of a set screw 41 and one leg extends into the inlet end of hole 36 and it is upon this wire that the paper is initially formed. As appears in Fig. 1, the paper enters hole 36 through its inlet end and it there engages wire 40 and curls around it. The curling or folding line extends longitudinally of the paper and as the curled paper passes through the constriction in hole 36, it assumes a substantially tubular shape.

Forming die 35 is also mounted on frame 23. It is supported by slotted post 42 which is adjustably connected by means of bolt 43 to a bracket 44 which is affixed to frame 23. It will be seen that by reason of this construction forming die 35 may be raised or lowered relative to the supporting frame 23 and when post 42 is elevated out of engagement with said supporting frame 23, the forming die may also be angularly adjusted about bolt 43.

After the tubular paper leaves forming die 35, it passes exteriorly of hoop 45 and through eyes 46 and 47 formed peripherally of drum 48 which constitutes the spinner or twister of the present machine. This drum is fixedly mounted on a rotatably mounted shaft 49 which is connected by means of a drive belt 50 to a source of motive power, such as an electric motor (not shown). Bearings 51 and 52 respectively support said shaft 49 on frame members 53 and 54 respectively, which may be connected to supporting frame 23 above mentioned.

An axially aligned hole 55 is provided in shaft 49 and radial passages 56 and 57, formed respectively in the hub of the drum and in the shaft itself, and communicating with said axial hole 55, enable the paper to proceed into said axial hole from eye 47. The paper passes through said axial hole and thence through a twist forming die 58 supported on bracket 59. Dies 35 and 58 are coaxial, either actually or substantially so, with shaft 49.

It will be understood from the foregoing that as drum 48 rotates with shaft 49, the curled or tubular tape 25 is carried along therewith in the eyes formed in said drum and said tape is thereby caused to describe a continuous movement of revolution at the same time that it is caused to move longitudinally of itself, by the means shortly to be described. This has the effect of twisting the tubed paper and the frequency of the twists formed therein will be determined by the ratio of its revolutions to its longitudinal speed in a given time interval.

In addition to performing its twisting function above described, drum 48 also serves as a safeguard which encloses some of the winding mechanism to which reference will shortly be made. Hoop 45 also serves in the manner of a safeguard, principally to prevent entanglement of the moving paper strip with said winding mechanism when the machine is in process of being started as well as when it is caused to slow down preparatory to stopping it completely. When the machine operates at full or substantially full speed, centrifugal force will urge the paper strip to bow or balloon outwardly as very clearly appears in Fig. 1.

Suspended from shaft 49 is the mechanism that pulls the tape through the wetting and twisting parts of the machine and which winds the finished cord product upon a spool. A bearing 60 is mounted on shaft 49 within the confines of drum 48. Supporting brackets 61 are attached to said bearing 60 and it is upon these brackets that the pulling and winding mechanism last above mentioned is supported. It is also on said brackets that hoop 45 is mounted.

A pair of brackets 62 extends upwardly from main brackets 61 and supports a pair of arms 63 which are pivotally connected thereto by means of pins 64. See Figs. 8 and 9. A shaft 65 is mounted on brackets 61 and it will be noted that said shaft carries a wheel 66 having a V-groove 66a which receives the twisted tape or cord from twist forming die 58. The V-grooved wheel 66 is caused to engage in rotary movement by the means hereinafter described and it, therefore, not only serves as one of the elements which draw the cord through the twisting mechanism as well as through the wetting mechanism and assist in carrying it to the winding mechanism but the V-grooved wheel also acts as a compressor as the cord is drawn down into the V-groove, resulting in strengthening and smoothing the cord. After the cord leaves the V-grooved wheel 66, it proceeds around another V-grooved wheel 67, also supported by brackets 61 and thence, it proceeds to an eye 68 which feeds the cord to spool 69.

Posts 82, mounted on brackets 61 support a shaft 80 to which a worm gear 83 is affixed. This worm gear is positioned for engagement with a worm 84 formed at the end of shaft 49. As said shaft 49 is caused to rotate so is worm 84, and with it worm gear 83 and shaft 80. A gear wheel 85 on shaft 80 engages another gear wheel 85a which has meshing engagement with gear 85 on shaft 65 and said last mentioned shaft is accordingly caused to rotate when shafts 80 and 49 are themselves caused to rotate. Since V-grooved wheel 66 is mounted on shaft 65, said pulley will engage in corresponding rotary movement and thereby assist in drawing the cord from the twist forming die 58.

Also supported by brackets 61 is another pair of brackets 70. These brackets last named support a shaft 71 which carries a roller 75. This roller, as will hereinafter be seen, is in relatively tight contact with spool 69 to insure a satisfactory winding operation. A gear wheel 76 is connected to shaft 71 and a gear chain 77 connects said gear 76 to another gear 78 which is affixed to shaft 80. Hence when shaft 80 is caused to rotate by reason of the engagement of its worm gear 83 with worm 84, gear wheels 78 and 76 are likewise caused to rotate as are shaft 71 and pressure roller 75 mounted thereon. Since roller 75 is in tight contact with spool 69, said spool will also be caused to rotate in view of the fact that the spool is rotatably mounted on arms 63 by means of pins or spool holders 69a. The rotary movement of spool 69 thus effected, cooperates with V-grooved wheel 66 in drawing the cord through the machine. It is this rotary movement of the spool that also causes the cord to be wound upon the spool.

A pulley 90 is connected to one of the spool holders 69a. It is operatively connected to another pulley 91 by means of a drive belt 92. Pulley 91 is affixed to a shaft 93 which is also supported by arms or brackets 63. A double screw 96 which has right and left threads is provided on shaft 93 and a nut 97 engaging said screw threads is mounted on said screw. It will be understood that when pressure roller 75 causes the spool to rotate, said spool will cause corresponding rotation of screw 96 through the pulley and belt means above described. Screw 96 will accordingly be caused to rotate in a given direction. Nut 97 mounted thereon will thereby be caused to move first to the right and then to the left on said screw and then again to the right in a continuous oscillating or reciprocating process which will continue as long as the screw is in rotation. To prevent the nut from engaging in angular movement about the screw at the same time that it engages in reciprocating linear movement thereon a U-shaped bracket 98 is provided on said nut which engages a rod 99 supported by brackets 70. Another bracket 100 is connected to U-shaped bracket 98 and it will be noted that bracket 100 supports eye 68 above mentioned.

It will be understood from the foregoing that when the machine is in operation spool 69 is caused to rotate and to receive the twisted cord from eye 68. Since said eye is connected by means of brackets 100 and 98 to nut 97, it will be caused to engage in reciprocatory movement with said nut, longitudinally of said spool. Hence when the cord is wound upon the spool, it extends diagonally thereof in both directions as is clearly shown in Figs. 2 and 7.

It has above been stated that pressure roller 75 is maintained in relatively tight contact with spool 69 during the course of the spool winding operation. The means by which this is accomplished is best shown in Figs. 8 and 9. It will there be seen that brackets 70 are provided with longitudinal slots 103 which accommodate rod 99 aforementioned. This rod is connected to rods 101 which are supported by bearings 102. Rods 101 are movable longitudinally of themselves within the limits of slots 103. A pair of cam followers 105 and 106 respectively is mounted on each said rod 101, cam follower 105 being fixedly mounted thereon and cam follower 106 being loosely mounted thereon for slidable movement of said rod 101 therethrough. Cam follower 106 is, however, fixed against longitudinal movement relative to the bracket 70 to which it is adjacent. The two cam followers are spaced from each other and a compression spring 107 is mounted on rod 101 between fixed cam follower 106 and the means which connects said rod to rod 99. Compression springs 107 act to urge rods 101 and rod 99 connected to said rods 101 toward the right as seen in Figs. 8 and 9, that is in the direction of pressure roller 75.

Disposed between each pair of cam followers is a cam 110 which is pivotally connected at 111 to adjacent arm or bracket 63. It will be noted that each cam 110 is smaller at its upper end and larger at its lower end. Hence, when rods 101 are urged to move toward the right in response to the action of springs 107 thereon, cam followers 105 are brought into tensioned engagement with the cams, thereby urging the cams to move downwardly and thereby pulling the arms or brackets 63 downwardly with said cams. The net effect of this downward movement of cams 110 and arms 63 is to bring the spool into tensioned engagement with the pressure roller 75. As cord is wound upon the spool and it increases in girth, arms 63 are caused to pivot upwardly, carrying cams 110 with them. This upward movement of the cams tends to urge cam followers 105 to move toward the left as viewed in Figs. 8 and 9, and since such leftward movement is resisted by springs 107, the upward movement of the cams and hence of arms 63 is correspondingly resisted. The spool remains, therefore, in tensioned engagement with the pressure roller 75 at all times.

It will be understood that as the winding eye 68 moves laterally of the spool, first in one direction and then in the opposite direction, the distance between said eye and the feeding pulley 67 varies. When the eye is positioned centrally of the spool, the distance between the eye and pulley 67 is relatively short. As the eye moves toward either end of the spool, however, the distance between the eye and the pulley increases. To avoid strain upon the cord as the eye moves toward the ends of the spool and to avoid a slack in the cord as the eye moves toward the center of the spool, a compensating plate 115 is provided between the pulley and the eye and is supported by brackets 61. See Figs. 1, 8, 9, and 10. This compensating plate is rounded intermediate its ends to increase the travel distance of the cord from pulley 67 to eye 68 when the eye is positioned adjacent the center of the spool. The compensating plate decreases the travel distance of the cord from said pulley to said eye as the eye moves toward either end of the spool. Hence a constant travel distance of the cord from the pulley to the eye is provided irrespective of the position of said eye relative to the spool.

The foregoing is descriptive of a preferred form of this invention, and it will be appreciated that this form may be modified in many ways within the broad scope of the invention. For example, although drum 48 has hereinabove been described as supporting only two eyes 46 and 47 respectively, the same drum may also be provided with additional eyes such as eyes 120 and 121 respectively situated diametrically opposite eyes 46 and 47. Eyes 120 and 121 may serve only to counterbalance eyes 46 and 47 or they may be used when it is desired to intertwine two twisted paper strips or other strands 25 into a single cord. Only one set of eyes need be used however, when a cord of single strength is desired. Other variations of the present machine are herein contemplated although they are not herein shown or described. It should also be clearly understood that although the machine is described as being suitable for making paper cord, the machine is equally suitable, with or without modifications within the skill of the art, to make cord or yarn of other material.

Having thus described my invention, what I claim as new and desire to secure by Letters Patent, is:

1. A cord twisting machine of the character described, comprising a rotatably mounted reel for a roll of strip material suitable for twisting into a cord, a wetting roller rotatably mounted adjacent said reel for wetting engagement with the strip material from said roll, a forming die positioned adjacent said wetting roller, through which the wet strip material is drawn and curled into substantially tubular shape, a rotating drum adjacent said forming die and substantially coaxial therewith, eyes provided on the periphery of said drum for receiving the tubular strip from the forming die, a rotating shaft on which the drum is fixedly mounted and with which the drum rotates, an axial hole formed in said shaft through which the tubular strip passes after it leaves the eyes on said drum, the tubular strip being twisted by rotation of said drum and passing through a twist forming die which is positioned in axial relationship with said shaft hole, a grooved wheel which is rotatably mounted adjacent said twist forming die to receive and draw the twisted strip therefrom, said wheel being connected to the shaft for rotary movement therewith, a rotatably mounted spool positioned to receive the twisted strip from said wheel, a rotatably mounted pressure roller engaging said spool and causing rotation of said spool as it receives the twisted strip from the pulley, said pressure roller being also connected to said shaft for rotary movement therewith, and a guide eye through which the twisted strip passes before it reaches the rotating spool, said guide eye being reciprocatively movable longitudinally of said spool, being caused to engage in such reciprocating movement by means of a right and left screw which is connected to said spool for rotation therewith and a nut which engages said screw for reciprocatory movement thereon, said guide eye being connected to said nut for movement therewith.

2. A cord twisting machine in accordance with claim 1, wherein a common frame is provided for supporting the twist forming die, the grooved wheel adjacent thereto, the spool, the pressure roller, the screw, the nut on said screw, and the guide eye connected to said nut said frame being supported on the shaft, a bearing being interposed between said frame and said shaft to enable the shaft to rotate without causing corresponding rotation of said frame supported thereby.

3. A cord twisting machine in accordance with claim 1, in which the shaft on which the drum is mounted is provided with a worm which engages a worm gear, a gear train interconnecting said gear with the twisted strip drawing grooved wheel to cause rotation of said grooved wheel when the shaft rotates, a second gear train being provided between said gear wheel and the pressure roller to cause rotation of said roller and hence of the spool which it engages, when the shaft rotates.

4. A cord twisting machine in accordance with claim 1, further characterized by having a frame supported by means of a bearing from the shaft on which the drum is mounted, the pressure roller being mounted on said frame, a second frame which is pivotally supported by the first frame, said spool being mounted on said second frame, and said second frame being under spring tension to urge it to pivot in the direction of the first frame, thereby bringing the spool into tensioned engagement with the pressure roller and maintaining it in such engagement with the roller, whereby rotation of the roller causes corresponding rotation of the spool in the opposite direction.

5. A cord twisting machine in accordance with claim 4, further characterized by having cam followers on the first frame, the means which maintains the second frame under spring tension and urges it to pivot in the direction of the first frame comprising a pair of cam members on the second frame which are engaged by said cam followers, said cam followers being in tensioned engagement with said cams and tending to urge said cams to move in the direction of the first frame.

6. A cord twisting machine in accordance with claim 1, in which a curved compensating plate is supported on said first frame and located between the grooved wheel and the eye, said curved plate being positioned to serve as a bearing for the cord which passes from the grooved wheel to the eye to compensate for the varying travel distances of the cord as the guide eye reciprocates laterally of the spool.

BENJAMIN MILTON KIMBALL.

No references cited.